United States Patent

[11] 3,566,038

[72] Inventor Martin J. Slavin
Huntington, N.Y.
[21] Appl. No. 800,943
[22] Filed Feb. 20, 1969
[45] Patented Feb. 23, 1971
[73] Assignee Instrument Systems Corporation
Huntington, Long Island, N.Y.

[54] MULTIPLEXED ENTERTAINMENT-SERVICE SYSTEM
30 Claims, 8 Drawing Figs.

[52] U.S. Cl. .......... 179/15, 340/318, 179/1, 179/18
[51] Int. Cl. .......... H04j 3/12
[50] Field of Search .......... 179/15 (A), (SYNC), 18.9, 1.1; 340/155, 318

[56] References Cited

UNITED STATES PATENTS

| | | | |
|---|---|---|---|
| 1,944,308 | 1/1934 | Turner .......... | 179/1(.1) |
| 1,968,546 | 7/1934 | Van Dyck .......... | 179/1X(.1) |

*Primary Examiner*—Ralph D. Blakeslee
*Attorney*—Blum, Moscovitz, Friedman and Kaplan

ABSTRACT: An entertainment-service system wherein a plurality of local stations are permitted to selectively receive one or more of a plurality of channels of audio signals and to control one or more utilization circuits associated with each local station or a group of such stations through the use of multiplexing techniques.

INVENTOR.

MARTIN J. SLAVIN

BY

Blum, Moscovitz, Friedman & Kaplan

ATTORNEYS

INVENTOR.

MARTIN J. SLAVIN

BY

Blum, Moscovitz, Friedman & Kaplan

ATTORNEYS

INVENTOR.
MARTIN J. SLAVIN
BY
Blum, Moscovitz, Friedman & Kaplan
ATTORNEYS

INVENTOR.
MARTIN J. SLAVIN
BY
Blum, Moscovitz, Friedman & Kaplan
ATTORNEYS

INVENTOR.
MARTIN J. SLAVIN
BY
Blum, Moscovitz, Friedman & Kaplan
ATTORNEYS

INVENTOR.

MARTIN J. SLAVIN

BY

Blum, Moscovitz, Friedman & Kaplan
ATTORNEYS

INVENTOR.
MARTIN J. SLAVIN
BY
Blum, Moscovitz, Friedman & Kaplan
ATTORNEYS

INVENTOR.
MARTIN J. SLAVIN
BY
Blum, Moscovitz, Friedman & Kaplan
ATTORNEYS

MULTIPLEXED ENTERTAINMENT-SERVICE SYSTEM

BACKGROUND OF THE INVENTION

This invention relates generally to entertainment-service systems of the type applicable to a plurality of remotely located stations such as the seat locations of an aircraft. In the art, it is common to transmit each of a plurality of channels of audio input on a separate cable, each station being provided with means for tapping all of the channels to provide access to all of the channels of audio input. Further, to control utilization circuits such as service call lights and lamps for reading or general illumination, it is customary to provide direct wiring between a utilization control means, such as a switch at said station and the corresponding utilization circuits. Finally, still further cabling is generally required if centrally located supervisory utilization circuits responsive to the remotely located supervisory control means are to be provided.

These arrangements greatly increase the weight of the system due to the huge amount of cabling required. Further, the huge amount of cabling greatly increases the complexity of the job of installing and servicing such systems. These features are of particular importance in aircraft where weight and down time for servicing are critical factors.

SUMMARY OF THE INVENTION

Generally speaking, in accordance with the invention, an entertainment-service system utilizing multiplexing techniques, preferably of the pulse code modulation-type, is provided. Said system includes multiplexing means connected to a multichannel source of audio input for multiplexing the channels into a single signal, a plurality of demultiplexer means for receiving said single multiplexed signals, at least one control means disposed at each of the stations to be served by said system and associated with one of said demultiplexer means including channel selector means and utilization control means and at least one transducer means disposed at each station for converting the audio electrical signal to sound, said demultiplexer means each being adapted to reconstruct from the multiplexed signal the contents of the input channels selected by a channel selector means associated therewith and transmit same to the corresponding transducer means.

Further, the entertainment-service system according to the invention includes a plurality of remotely located utilization circuits, at least one of said utilization control means being associated with each of said utilization circuits, a plurality of coder means for detecting the state of the utilization control means associated therewith and for transmitting, when activated, data representative of said state to a data line and decoder means associated with each coder means for controlling the state of the corresponding utilization circuits and for receiving, when activated, the data representative of the state of the corresponding utilization control means from said data line. Column timer means are provided for producing clock and frame synchronization pulses, the column timer means and coder means being in series connection and the column timer means and decoder means being in series connection in the same sequence as the corresponding coder means for sequential activation of each of said coder means and its corresponding decoder means in response to said pulses during the same time frame. In this manner, each of said utilization circuits is placed in a state responsive to the state of its corresponding utilization control means.

Accordingly, it is an object of this invention to provide a single system which provides full entertainment and service functions including a plurality of channels of audio input and individual control of a variety of utilization circuits.

Another object of the invention is to provide a system which permits the introduction into the main multiplexed signal of a plurality of groups of further channels of audio inputs.

Still another object of the invention is to provide a system wherein two channels may carry a stereo program, which is transmitted to a transducer at a remote station in response to a single channel selection at said station.

Still another object of the invention is to provide a system wherein one selectively applied channel is adapted to override the remaining channels, as for emergency use.

Another object of the invention is to provide a system wherein special circuitry associated with each station is not required to identify that station in applying multiplexing techniques to the operation of utilization circuits.

A further object of the invention is to provide a system wherein certain components such as the local coders and local decoders are interchangeable among themselves.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
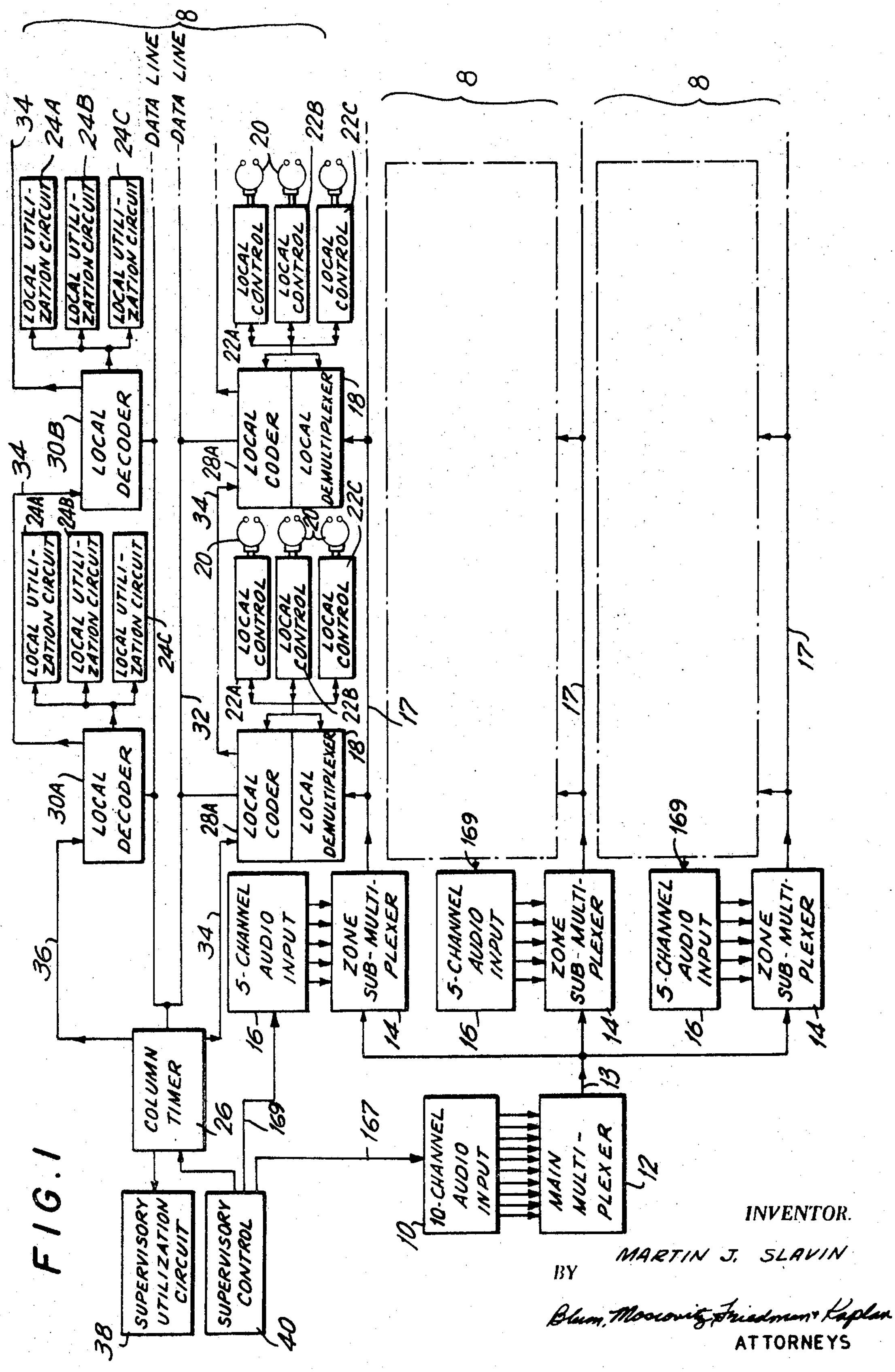
FIG. 1 is a schematic representation of one-type of entertainment-service system according to the invention.

Referring now to FIG. 1, the entertainment-service system depicted utilizes multiplexing techniques, preferably of the pulse code modulation-type, to permit a plurality of local stations to selectively receive one or more of a plurality of channels of audio signals and to control one or more utilization circuits associated with each local station or a group of such stations. Pulse code modulation is a form of time division multiplexing wherein the time available to transmit a plurality of channels of information is divided into a plurality of discrete intervals or frames which are assigned successively to each of said channels. Each channel of information to be transmitted is successively sampled and the analogue value thereof is converted to a digital pulse code. Each of said intervals or frames are in turn divided into time slots, one of said time slots being assigned to each bit of the digital code. Further time slots can be assigned for the transmission of other information, if desired. In this manner a plurality of channels of information may be transmitted over a single line and reconstructed at the receiver to produce the plurality of channels of information originally transmitted.

In particular, in the system according to the invention, an audio input 10, for example having ten channels, feeds into a main multiplexer 12. Said main multiplexer originates the basic system timing, multiplexes the input signals by sequentially sampling each of the channels and converting the analogue signals to digital form, and transmits, along line 13, the resulting digital data along with clock and synchronization signals in the form of a train of pulses, to the zone submultiplexers 14. In the embodiment shown in FIG. 1, five further channels of audio input 16 are applied to each zone submultiplexer 14. Each of said zone submultiplexers function in a similar manner to main multiplexer 12 to multiplex said five additional channels and to interleave the resulting digitized multiplexed signal in the appropriate frames of the main multiplexer output signal. The timing and sampling arrangements of said main multiplexer are adapted to provide the additional frames required in each cycle to permit the addition of the further five channels of audio input by each zone submultiplexer 14.

The output of each zone submultiplexer 14, which consists of fifteen channels of multiplexed information is applied to a single line 17. Reconstruction of the multiplexed signal for the remotely located stations is performed by a plurality of local demultiplexers 18, each of which taps its respective line 17, reconstructs the multiplexed signal into its component channels of analogue audio signals and transmits to its corresponding headsets 20 disposed at each remote station the particular channel selected by the local control 22 (22A, 22B or 22C) associated therewith. In this manner, a plurality of audio channels are transmitted to a plurality of stations represented by local controls 22 and headsets 20 associated therewith. Each of said stations can be remotely located relative to the audio inputs 10 and 16, main multiplexer 12 and zone submultiplexer 14, while requiring only a single channel for information transmission, and therefore a minimum of wiring. Despite the use of a single channel for transmission, each local control 22 can select one or a pair of said channels (as in the case of stereo transmissions) to provide the user at the remote station with an accurate reproduction of the audio signal from the multichanneled input 10 and 16.

Local controls 22 are also adapted to permit each remote station to control, through the application of multiplexing techniques, a local utilization circuit 24 (24A, 24B or 24C) associated therewith. Such local utilization circuit might include, for example, service call lights, other forms of attention-attracting alarm means, or lamps for general illumination or reading.

For this purpose, column timer 26, a plurality of local coders 28 (28A, 28B,...,28K) and a corresponding number of local decoders 30 (30A, 30B,...,30K) are provided. Column timer 26 is adapted to produce the basic timing for this portion of the system, transmitting a clock and synchronization signal along data line 32 which interconnects said local coders.

Each cycle is divided into frames, one frame being alloted to each local coder-decoder pair. Each frame is in turn divided into time slots allocated to each function to be performed such as the state of the portion of local control 22A which governs the service call light in local utilization circuit 24A or the state of the portion of local control 22C which governs the light in local utilization circuit 24C. Data is transmitted in the form of a train of pulses, the presence or absence of a pulse in each time slot governing the corresponding function. Each of said local coders are identical and adapted, when activated, to detect the state of the local controls associated therewith and to transmit digital data identifying said state to data line 32 during predetermined time slots and frames. In like manner, each of said local decoders are identical and are adapted to query said data line during predetermined time slots and frames to detect the local control state data transmitted by the corresponding local coder, and to operate the local utilization circuits 24 associated therewith, so that they are disposed in accordance with the settings of local controls 22.

Activation of local coder 28 and local decoders 30 in the appropriate time frames is accomplished in response to the clock and synchronization signal generated by column timer 26 which is also transmitted along shift lines 34 which connect said column time and local coders 28 in series and shift lines 36 which connects said column timer and local decoders 30 in series. The signal transmitted along shift lines 34 and 36 sequentially activates local coders 28 and local decoders 30 respectively so that for example, only local coder 28B and its corresponding local decoder 30B are activated during the second time frame, and therefore transmit and receive during that frame.

Column timer 26 may also be adapted to perform supervisory coder and decoder functions by querying data line 32 at predetermined time slots to detect local control state data contained therein for the activation of a centrally located supervisory utilization circuit 38 and to transmit to said data line, during predetermined time slots, digital data representative of the state of a supervisory control 40.

The embodiment of the entertainment-service system according to the invention shown in FIG. 1 incorporates zone submultiplexers 14 to introduce further channels of audio input 16. Such further channels would be required if it were necessary to provide a number of channels of unique audio input at each zone, as would be the case where movies were being projected at each zone and synchronization between sound track and film required separate transmission of said sound track at each zone. However, where such separate transmission is not required, the audio input 16 and zone submultiplexers 14 may be dispensed with in the entertainment-service system according to the invention. In such embodiments, local demultiplexers 18 would tap directly off line 13 to receive the output of main multiplexer 12.

Further, in the embodiment of the system shown in FIG. 1, one column timer 26 is provided for the group of local stations associated with each zone. However, depending on the number of local stations, the switching speed of the equipment, and the frequency with which each station must be scanned, a single column timer 26 may be utilized to control all of the local coders 28 and local decoders 30 in the system, without regard to the zone in which they may fall. In the alternative, more than one column timer might be utilized to control the local coders 28 and local decoders 30 in each zone, provided that each local coder and its corresponding local decoder are tied to only a single column timer. As shown by dashed lines 8, each line 17 would be provided with a complete set of local demultiplexers 18, local controls 22, local coders 22, a column timer 26, etc.

Figure 2:
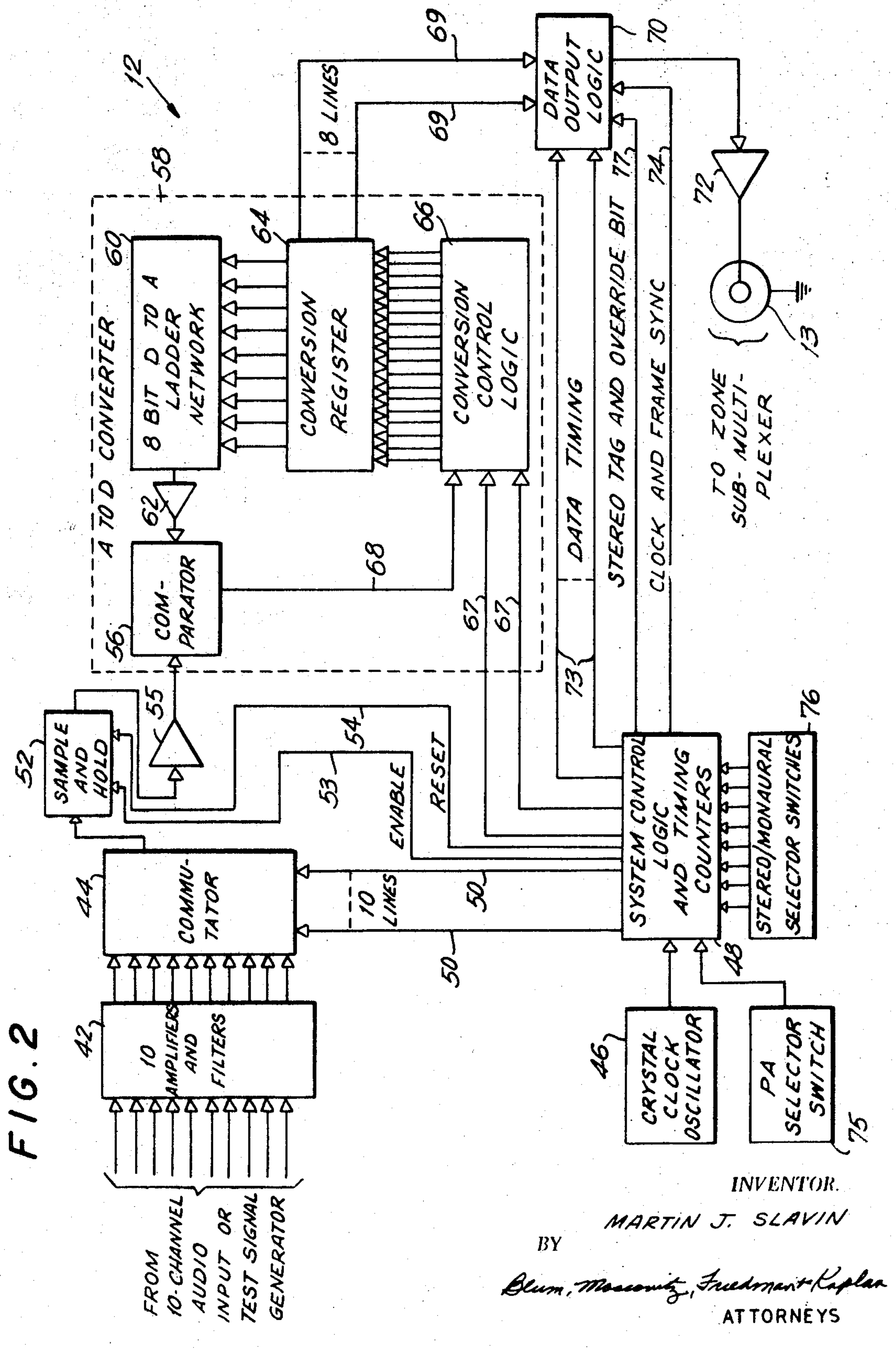
FIG. 2 is a schematic representation of the main multiplexer of said entertainment-service system.

Turning now to a more detailed discussion of the components of the entertainment-service system according to the invention, reference is had to FIG. 2 which shows a schematic representation of the main multiplexer 12. The ten channels of audio input 10 are applied to ten amplifiers and filters 42, the output of which is applied to an electronic commutator 44. The timing for the audio portion of the system is obtained from crystal clock oscillator 46 which is applied to system control logic and timing counters 48. Said system control logic and timing counters control the operation of the main multiplexer by providing the gating signals to insure proper synchronization and sequential timing of the components. Thus, ten lines 50 connect system control logic and timing counters 48 to commutator 44 to enable said commutator to sequentially sample each of the ten input channels during a predetermined time frame. Since the entire system, as shown in FIG. 1, would include 15 channels, the system control logic and timing counters would actually divide a single cycle into fifteen time frames, only ten of which are utilized by the commutator 44 of the main multiplexer. The remaining five time frames are preserved for the five additional channels to be introduced by each zone submultiplexer 14. The number of channels of the embodiment shown in the drawings is given by way of example and not by way of limitation, the actual number of channels in an entertainment-service system according to the invention being a matter of selection.

During the frame that each channel is being sampled, the sampled signal is applied to sample and hold circuit 52 which is also controlled by system control logic and timing counters 48 through an enable line 53 and a reset line 54. The held sample is applied through a driver 55 to comparator 56 of analogue to digital converter 58 of conventional design. The timing for analogue to digital conversion is also controlled by system control logic and timing counters 48. In the embodiment shown, analogue to digital conversion is performed by an 8-bit ladder network 60 which generates a series of voltages for application to comparator 56 through a driver 62. Said voltages are matched by said comparator to the sampled audio signal. The ladder network 60 is controlled by a conversion register 64 whose operation is in turn governed by a conversion control logic 66 responsive to system control logic and timing counters 48. When comparator 56 detects a match between the audio signal and the voltage output of the ladder network 60, a signal applied along line 68 to conversion control logic 66 causes conversion register 64 to transmit the digital code corresponding to the matched voltage along line 69 to data output logic 70. Said data output logic assembles the various components of the main multiplexer output signal with each bit in its assigned time slot and transmits said output signal through low impedance driver 72 to line 13, shown as a coaxial cable, for transmission to the various zone submultiplexers 14. Timing for data output logic 70 is also provided by system control logic and timing counters 48 through data timing lines 73.

The output signal from main multiplexer 12 consists of a periodic clock and frame synchronization signal having the digital data representing the audio signal in each channel interleaved therein, and is in the form of a train of pulses. The clock and frame synchronization pulses are provided directly to data and input logic 70 by system control logic and timing counters 48 through clock and frame sync line 74.

In some applications, it is desirable to provide a single channel of input, the activation of which overrides the other channels so that only the content of that channel is transmitted to headsets 20 irrespective of the channel selected by local control 22. Thus, it would be desirable to have the channel set aside for a public address system function in this manner. To this end, an override bit is transmitted by system control logic and timing counters 48 in an appropriate time slot in each frame to data output logic 70, along line 77 for interleaving in the output pulse train. Said override bit is generated in response to the activation of said predetermined channel as by P.A. selector switch 75. Upon detection of such override bits, local demultiplexers 18 transmit only the channel assigned to the public address system.

Still a further feature of the main multiplexer according to the invention is the provision of stereo/monaural selector switches 76. These selector switches introduce a stereo tag bit into a predetermined time slot of the frame assigned to the first of two adjacent channels carrying the left and right components of a stereo signal. When local demultiplexer 18 detects such a stereo tag, it will apply one of said pair of channels to the left and the other to the right side of headset 20, treating said two adjacent channels as a single channel for the purpose of channel selection by local control 22. This feature greatly increases the flexibility of the system since no channels are permanently dedicated to stereo transmission.

Each of the zone submultiplexers 14 operates in substantially the same manner as main multiplexer 12. The frame synchronization and clock signal utilized to regulate the system control logic and timing counters of the zone submultiplexers is stripped from the signal on line 13, although each of said zone submultiplexers can be provided with an auxiliary crystal clock oscillator, if desired, to provide a standby timing source in case of failure of the main multiplexer. In other respects, the zone submultiplexers preferably include system control logic and timing counters, commutator, sample and hold circuit, analogue to digital converter and data output logic similar in function and structure to the corresponding components of the main multiplexer but adapted to interleave the digitized lots corresponding to the five channels of audio input 16 in the appropriate frames and time slots reserved therefore and to pass the thus modified signal from line 13 to its respective zone line 17, which is also preferably a coaxial cable.

Figure 3:
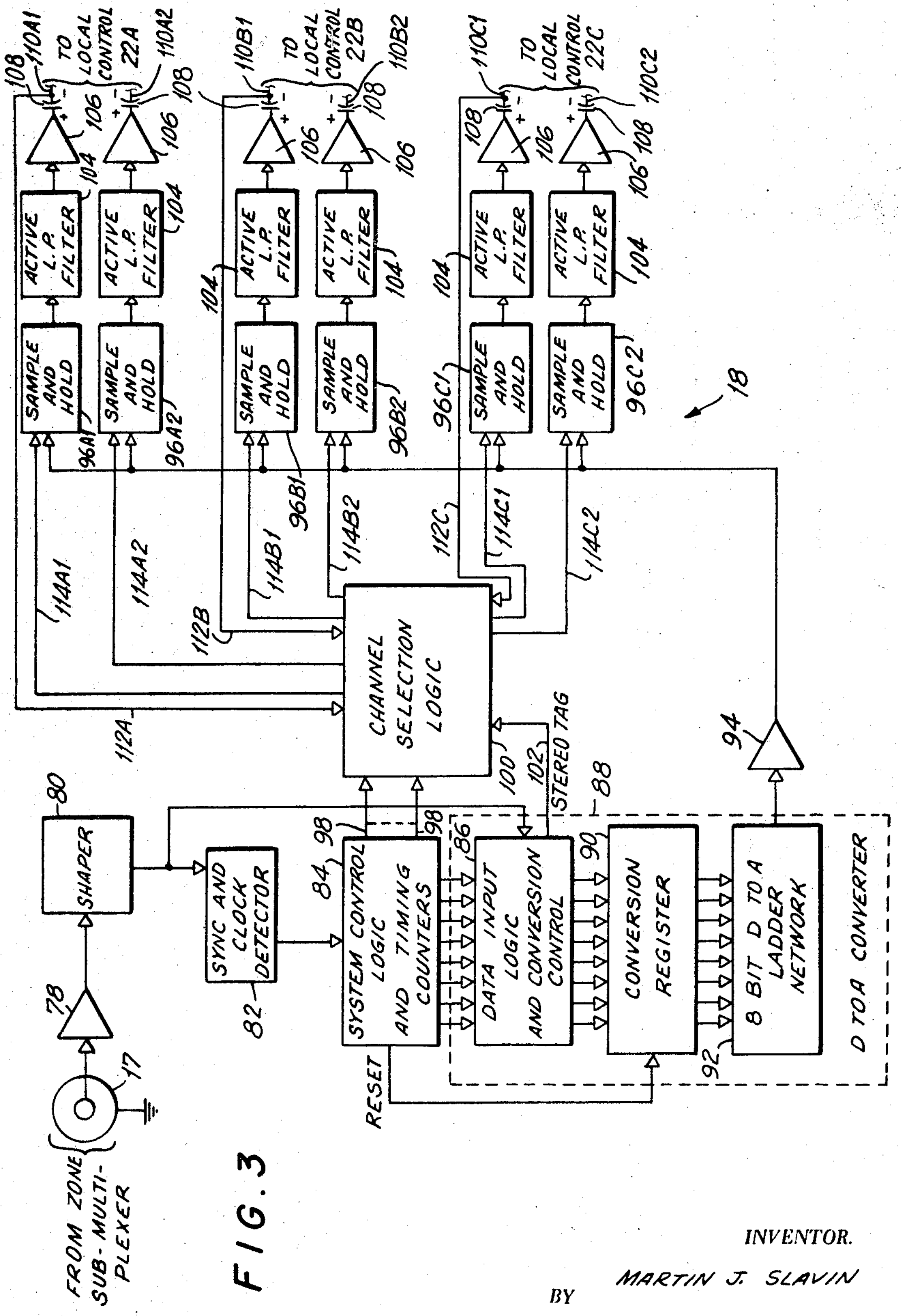
FIG. 3 is a schematic representation of the local demultiplexer of said entertainment-service system.

The signal from each zone line 17 is tapped off by the corresponding local demultiplexers 18, a schematic representation of one of which is shown in FIG. 3. The signal tapped from line 17 is amplified by high impedance amplifier 78 and applied to shaper 80 adapted to eliminate any spurious signals. The frame synchronization and clock portions of the signal are detected by sync and clock detector 82 which applies these portions of the signal to the system control logic and timing counters 84 which control the timing and operation of the remaining components of the local demultiplexer. The clock signal drives the counters and logic while the frame synchronization is used to lock the system timing to that of zone submultiplexer 14 and main multiplexer 12. The signal from shaper 80 is also applied to the data input logic and conversion control 86 of digital to analogue converter 88. This signal includes, sequentially, the digitized instantaneous value of each of the input channels' audio signal plus stereo tag bits, if any. As each data bit is received, the corresponding flip-flop in the conversion register 90 is set to that data bit condition which in turn sets the 8-bit digital to analogue ladder network 92 to the original sample audio values. This ladder network analogue voltage is applied through driver 94 to a plurality of sample and hold networks 96 (96A–1, 96A–2, 96B–1, 96B–2, 96C–1, 96C–2) One of said sample and hold networks are associated with each audio output circuit, two of said audio output circuits being provided for each station (headset 20 and local control 22), whereby each station is provided wit full stereo capability.

The system control logic and timing counters 84 provide timing signals through lines 98 to channel selection logic 100. Said channel selection logic also receives the stereo tag, if any, from the data input logic and conversion control 86 along line 102 to determine whether a single channel of information should be applied to both audio output circuits associated with a single station or whether one of a pair of adjacent channels of information should be applied to each of said two audio output circuits to produce a stereo effect.

Each of said sample and hold circuits 96 drives an active low pass filter 104, which drives into an amplifier 106 connected at its output to capacitor 108, which in turn is connected to the audio output line 110. Each pair of audio output lines 110A–1 and 110A–2, 11OB–1 and 110B–2, and 110C–1 and 110C–2, are connected to one of said local controls 22 (22A, 22B and 22C respectively) which contain channel selection means and headset 20 which is operated by the signal from said audio output lines.

Channel selection logic 100 detects the setting of each local control 22 by means of lines 112A, 112B and 112C connected respectively to audio output lines 110A–1, 110B–1 and 110C–1 in a manner to be described below. In response to the signal from said lines 112A, 112B and 112C, channel selection logic 100 gates each sample and hold circuit 96 into and out of operation during the time frame corresponding to the channel selected at the respective local control. This gating signal is sent along sample lines 114A–1, 114A–2, 114B–1, 114B–2, 114C–1 and 114C–2. Thus, if local control 22A were set to select a stereo program, that fact would be detected by channel selection logic 100 through line 112A. Based on the system timing derived along lines 98, said channel selection logic would gate sample and hold circuit 96A–1 to sample and hold the output of amplifier 94 during the time frame assigned to the first of the pair of stereo channels selected while sample and hold circuit 96A–2 would be gated to sample and hold during the time frame assigned to the second of said pair of stereo channels. If a monaural channel is selected at local control 22A, sample and hold circuits 96A–1 and 96A–2 would be simultaneously gated to sample and hold the output of amplifier 94 during the same time frames, whereby the same audio signal is transmitted to both sides of headset 20.

Filters 104 are selected to pass only audio frequencies and to have a sharp attenuation characteristic to produce an audio output. This audio output is applied along each audio output line 110 to its corresponding local control 22.

Figure 4:
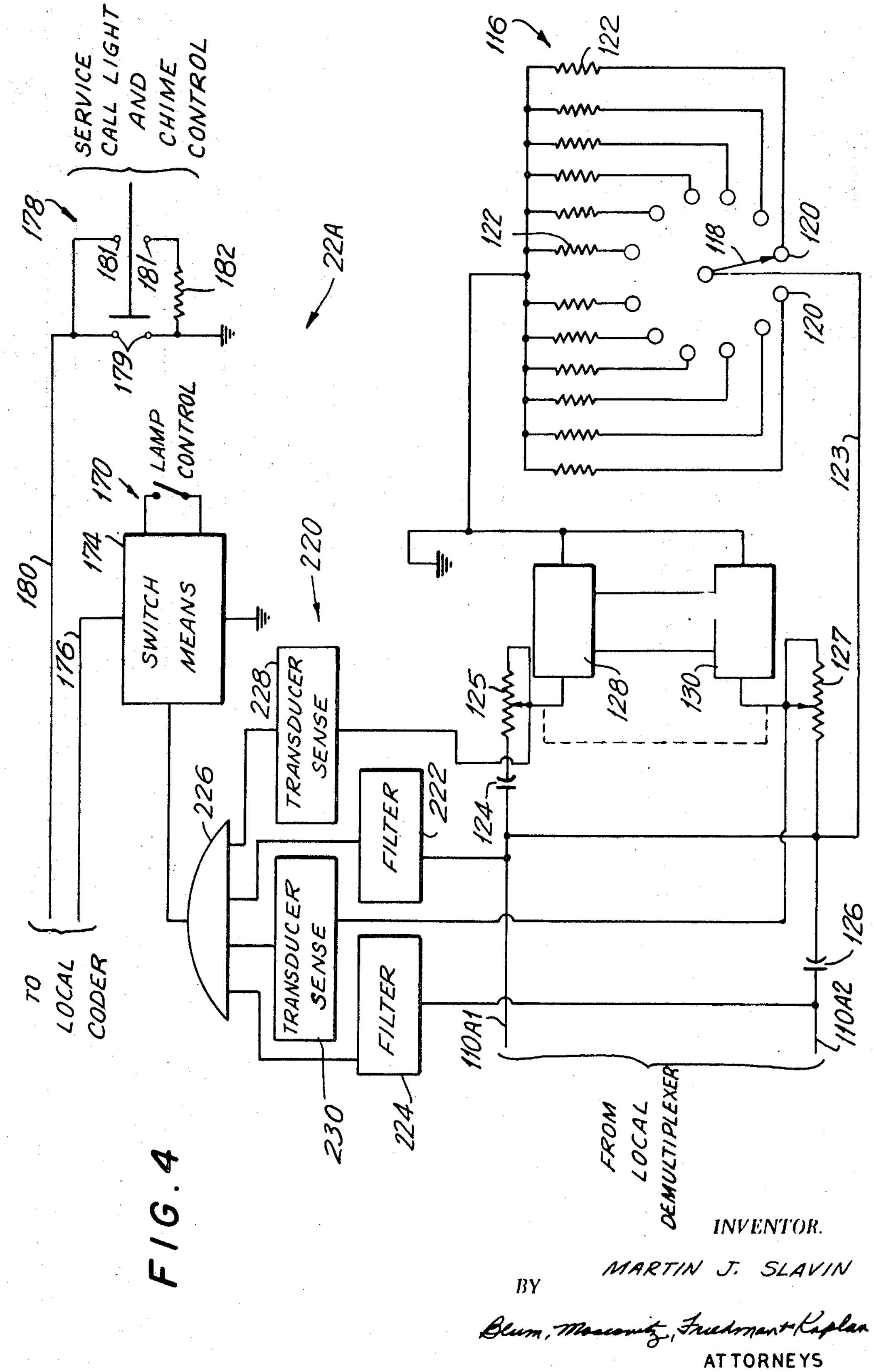
FIG. 4 is a schematic representation of the local control of said entertainment-service system including the self-test circuit for said system.

A block diagram of one of local controls 22 is shown in FIG. 4. The channel selection means 116 of said local control consists of a single pole multiple position rotary switch. Movable arm 118 of said switch selectively engages one of a plurality of fixed contacts 120 which are connected through resistors 122 to ground. Said movable arm is connected by means of line 123 to audio output line 110A–1, and therefor to line 112A of local demultiplexer 18, which in turn is connected to channel selection logic 100 for the purpose of detecting the state of said channel selection means.

Audio output line 110A–1 is also connected to capacitor 124 which in turn is connected to the input of rheostat 125. Audio output line 110A–2 is connected through capacitor 126 to the input of rheostat 127. The left and right transducers, 128 and 130 respectively, shown schematically, are connected between the wipers of said rheostats 125 and 127, respectively and ground. In this manner, the audio signal, whether stereo or monaural, is applied to the coils of transducers 128 and 130 which convert the electrical signal to sound for application to headsets 20. Adjustment of the rheostats 125 and 127 adjusts the volume of the signal applied to said headsets. Channel selection means 116 is shown in FIG. 4 with a 12-position switch, in which case several of the 15 input channels of audio would be stereo pairs automatically selected by one position on said channel selection means.

Each of said resistors 122 are of a different value. The selected resistor serves as a part of a voltage divider located within channel selection logic 100 of local demultiplexer 18. The output of said voltage divider is filtered to DC within said channel selection logic which is preferably provided with a ramp sweep generator and comparator. When said comparator matches the output of said ramp sweep generator with the output of said voltage divider as determined by the setting of movable arm 118, the comparator activates logic circuitry within channel selection logic 100 which, preferably through a digital code, identifies the selected circuit. As mentioned above, channel selection logic 100 is adapted to detect the stereo tag, if any, in which case two adjacent channels of stereo would be treated as a single program selected by a single position of selection switch 116. The foregoing arrangement permits the seat selection function to share one of each pair of audio output lines 110, thereby avoiding an additional cable extending between each local demultiplexer 18 and its corresponding local control 22.

Figure 6:
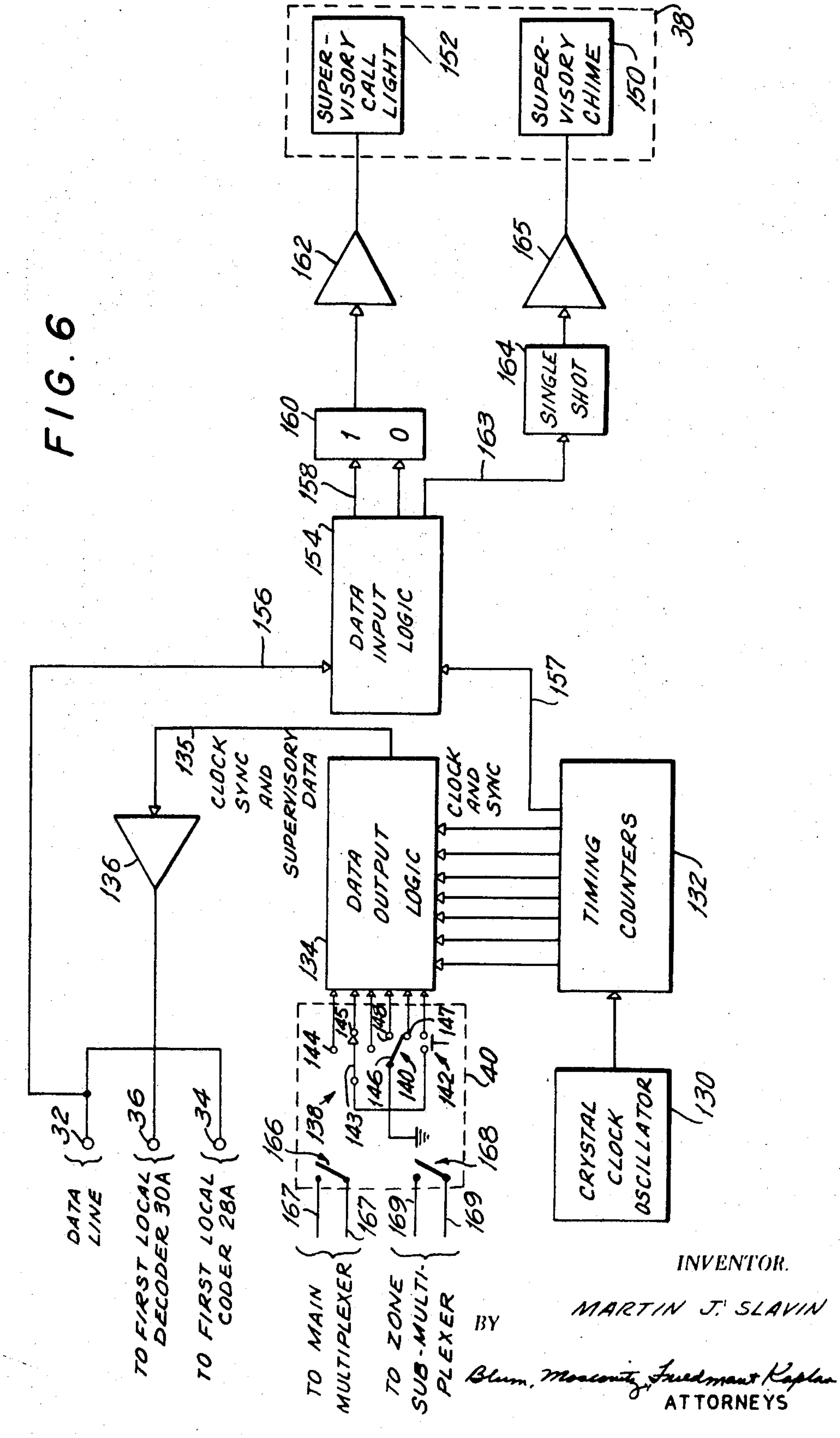
FIG. 6 is a schematic representation of the column timer, supervisory utilization circuit and supervisory control of entertainment-service system.

Turning now to the service portion of the system, an example of a column timer 26 and the supervisory utilization circuit 38 and supervisory control 40 associated therewith is shown in FIG. 6. Basic timing for this portion of the system is obtained by crystal clock oscillator 130 which provides a stable frequency source which drives timing counters 132 to produce system clock and frame synchronization pulses and to govern the operation of data output logic 134. Such clock and sync pulses are included in the train of pulses forming the output of data output logic 134 which is transmitted along line 135 to driver 136. This output signal is applied to data line 32 and shift lines 34 and 36. As discussed above, shift line 34 is connected to the first local coder 28A while shift line 36 is connected to the first local decoder 30A. This output signal is divided by the clock and sync pulses into a plurality of frames, each assigned to a particular local coder and its corresponding local decoder. Each of said frames is subdivided and time slots therein are assigned to each of the functions to be performed by the service system. The data in each time slot is generally applied by local coders 28 in response to the settings of the corresponding local controls 22. However, it is sometimes desired to provide supervisory control functions at a central location, in which case a supervisory control circuit 40 of the type shown in FIG. 6 might be connected to data output logic 134, which would then interleave in the appropriate time slots, as governed by timing counters 132, data responsive to the settings of said supervisory control.

In the embodiment shown in the drawings, the service portion of the system is adapted by way of example, to perform two functions, namely to activate a lamp associated with each local control and to activate a service call light associated with each group of three local controls. The supervisory control shown in FIG. 6 serves both a test and a functional purpose and consists of a three-position lamp test switch 138, a two-position service call light test switch 140 and a service call light reset switch 142. Lamp test switch 138 consists of movable arm 143 adapted to engage any one of three contacts 144, 145 and 146. When first contact 144 is engaged, data output logic 134 transmits the data required to turn all lamps in all local utilization circuits 24 on. When second contact 145 is engaged, data output logic 134 interleaves the data in the appropriate time slots of the output signal directing all lamps in all utilization circuits to be turned off, third contact 145 being a neutral position.

Service call light test switch 140 includes a movable arm 146 normally engaged to neutral fixed contact 147, but displaceable into engagement with the other fixed contact 148, in which case data output logic 134 will interleave into the pulse stream, the appropriate data necessary to activate all service call lights of all of said local utilization circuits. Reset call light switch 142, when depressed, causes data output logic 134 to interleave into the data stream in the appropriate time slots the data necessary to reset all of the service call lamps of all of said local utilization circuits. Also included are switches 166 and 168 which control the test signal generators utilized in the self-test feature of the system in a manner to be described below.

The embodiment of the system shown in the drawings also includes a supervisory utilization circuit 38, which is shown in FIG. 6 to include a supervisory chime 150 and a supervisory call light 152. To this end, column timer 26 is preferably provided with data input logic 154 which taps data line 32 by means of line 156. The timing of said data input logic is governed by timing counters 132 through line 157. If data input logic 154 detects that any one of the local controls 22 is set to enable its corresponding call light in its corresponding utilization circuit to light, a signal is passed along lines 158 to flip-flop 160, the output of which is connected to supervisory call light 152 through amplifier 162. Flip-flop 160 serves to latch the supervisory call light in the on position until all of the call light controls in all of the local controls 22 are reset. The affirmative act of resetting is required to insure that appropriate action is taken in response to each service call light. As a further alarm means in connection with the service call light, the activation of the service call light control at a local control 22 also results in the transmission by the local coder in the appropriate time slot of a pulse directing the ringing of supervisory chime 150. This pulse is detected by data input logic 154 to pass a signal along line 163 to single shot multivibrator 164 the output of which is connected to said supervisory chime through amplifier 165. The frequency and duty cycle of said single shot multivibrator 164 is selected to limit the frequency with which the chime rings.

As shown in FIG. 4, each local control 22 includes a manual lamp control 170 operative through switch means 174 to impress a signal on line 176, which in turn is connected to its corresponding local coder 28. Similarly, each local control 22 is provided with service call light and chime control 178, which, when depressed, closes contacts 179 to pass first signal along line 180 to said corresponding local coder, and when raised, closes contacts 181 connected in series with resistance 182 to pass a second, different, signal on line 180. Preferably, said first signal represents a command to light the corresponding service call light and ring the supervisory chime, while said second signal directs the resetting of said corresponding service call light.

Figure 7:
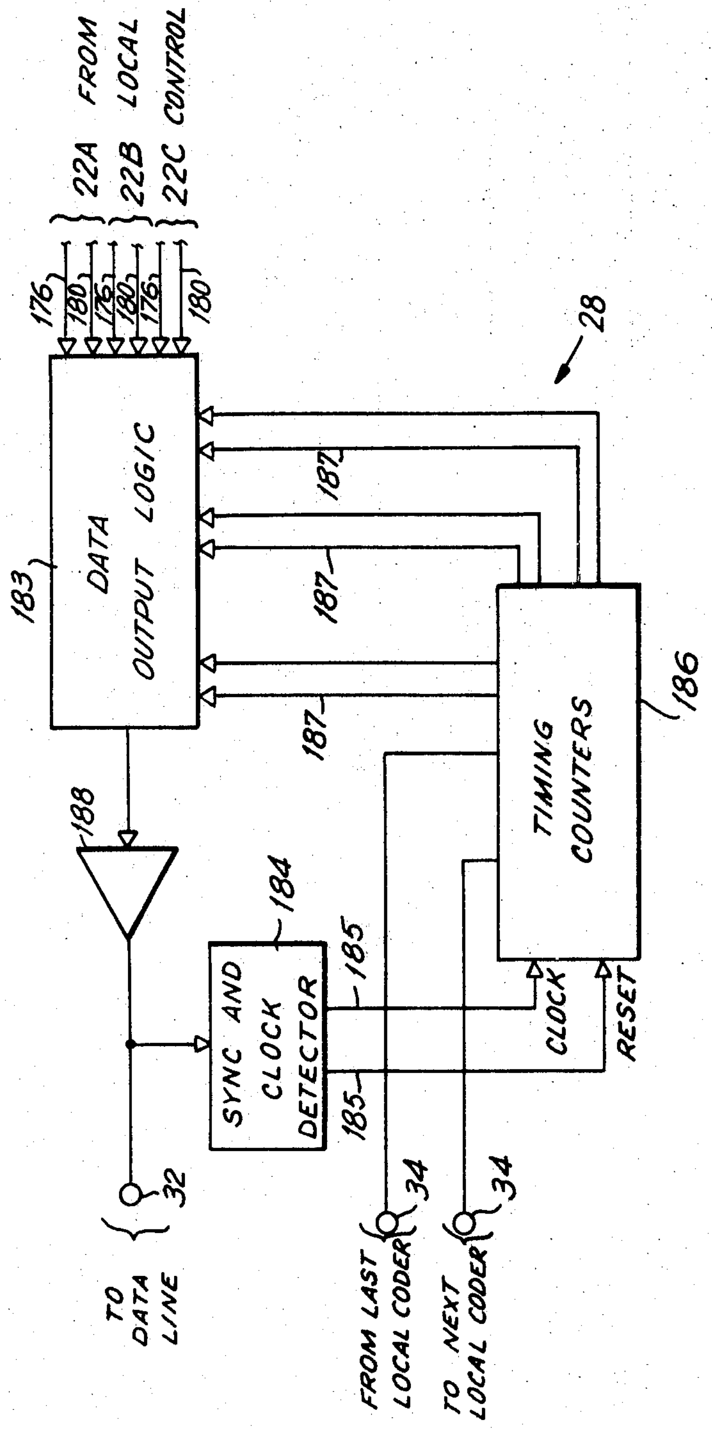
FIG. 7 is a schematic representation of the local coder of said entertainment-service system.

As seen in FIG. 7, which schematically represents one example of a local coder 28 according to the invention, lines 176 and 180 from the lamp control 170 and service call light and chime control 178 respectively of each local control 22A, 22B, 22C are applied to the date output logic 183 thereof. Timing for local coders 28 is obtained by means of sync and clock detector 184, preferably a chain of single shot multivibrators, which taps off data line 32 and strips the clock pulses from the pulse train. The clock and frame synchronization pulses are passed to timing counters 186 along clock and reset lines 185. Said timing counters control the functioning of data output logic 183 through lines 187 but are inhibited from driving said data output logic until a shift-in command is received from shift line 34 connected to the last local coder, or in the case of the first local coder 28A, connected to the column timer 26. This shift command consists merely of the sync and clock pulse and operates as follows. The frame synchronization pulse resets all of the timing counters 186 in all of the local coders 28A, 28B, — 28K, enabling the timing counters on the first local coder to respond to the clock pulses received from column timer 26 along shift line 34. When the timing counters 186 of said first local coder 28A have completed their cycle and directed data output logic 183 thereof to transmit the state data of the corresponding local controls 22, a shift-out command is generated by said timing counters and passed along shift line 34 to the timing counters of the second local coder 28B which is then activated to function as described above. This sequential activation of the local coders continues until the last local coder 22K has completed its cycle, at which time a frame synchronization pulse resets the entire portion of the system and a new cycle is commenced.

During the period that each local coder is activated, data output logic 183 detects the states of local controls 22A, 22B and 22C and, during appropriate time slots, transmits data representative of said states through low impedance driver 188 to data line 32. The sequential activation of said local coders insures that the data is interleaved into the proper frame for detection by the corresponding local decoder 30.

Figure 8:
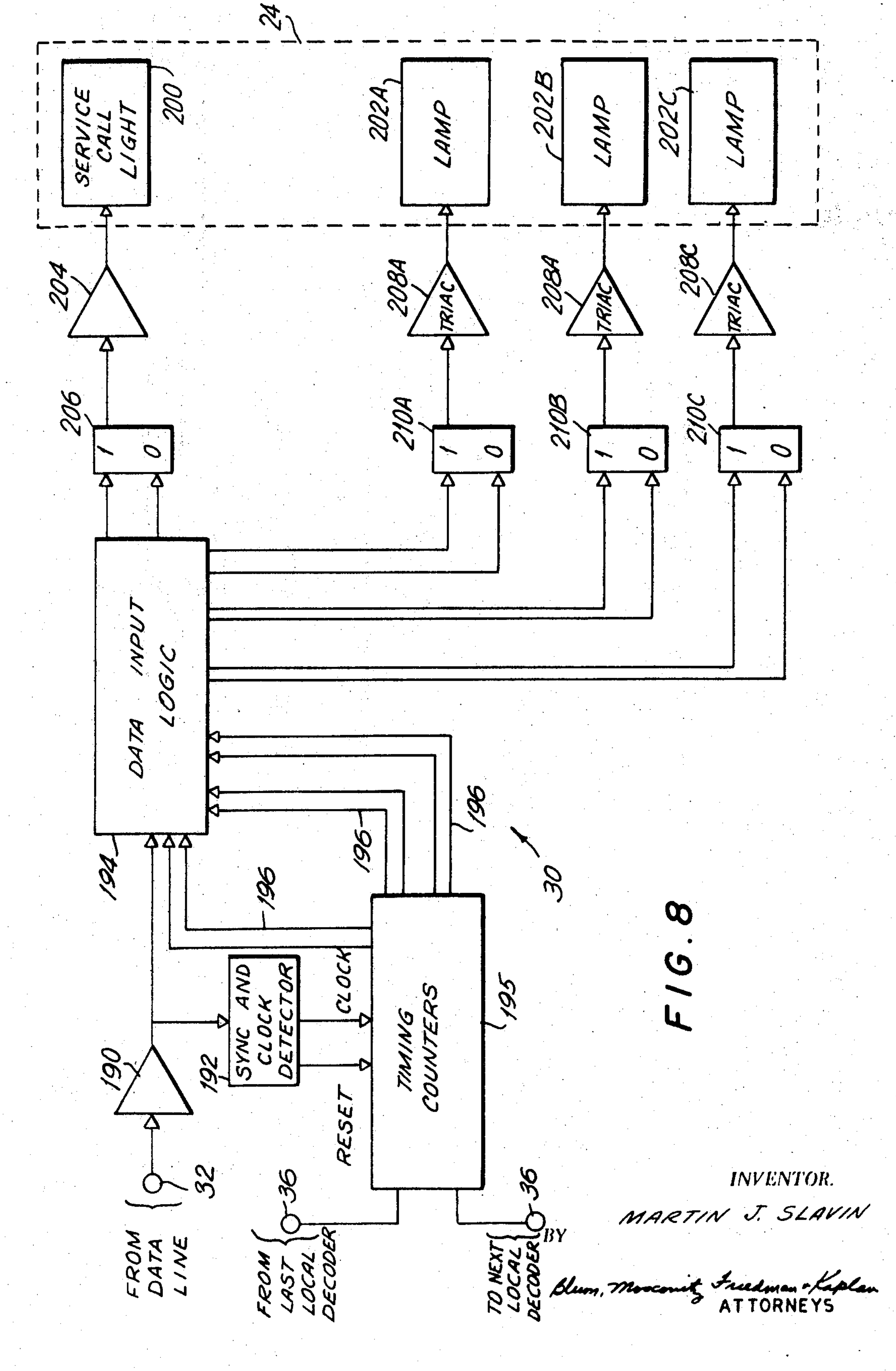
FIG. 8 is a schematic representation of the local decoder and local utilization circuits of said entertainment-service system.

Local coders 30, a schematic representation of one example of which is shown in FIG. 8, are designed to be sequentially activated in the same manner as said local coders. Thus, the pulse train is tapped off data line 32 and applied through driver 190, to sync and clock detector 192 and data input logic 194. Reset and clock pulses are applied from said sync and clock detector to timing counters 195 which are governed by shift commands from shift lines 36. Sync and clock detector 192, timing counters 195, and shift lines 36 function in the same manner as sync and clock detector 184, timing counters 186 and shift lines 34 of local coders 22, and a detailed description of their operation will not be repeated at this point. The operation of data input logic 194 is governed by timing signals obtained from timing counters 195 along lines 196.

In the embodiment shown in FIG. 8, the local utilization circuits 24A, 24B and 24C, have, in part, been combined to provide only a single service call light 200 for the three stations controlled by each local decoder 30. Of course, this system according to the invention can include separate service call lights for each station, if desired. Further, said local utilization circuits include a lamp 202 (202A, 202B and 202C) for each station. Service call light 200 is driven through driver 204 and flip-flop 206 by data input logic 194. In like manner, each lamp 202 is driven through a bi-directional gate-controlled thyristor which completes the AC path for said reading lamp when gated on, said gating signal being derived from flip-flop 210 controlled by data input logic 194. The data input logic 194 of each local decoder is activated in its proper time frame, detects the state data stored in each time slot of that frame and transmits a signal to the specific service call light on lamp of its utilization circuit 24 associated with said time slot to set the state of said call light or lamp. The group of local coders and the group of decoders are each in series connection for the purposes of sequential shifting. The correct local code and decoder are simultaneously activated during each frame, for example, local coder 28B and local decoder 30B.

The above-described arrangement permits both the local coders and local decoders to be interchangeable among themselves since special circuitry is not required for each station to identify the local control or utilization circuit associated with that station, while full multiplexing is accomplished. This feature offers substantial advantages in terms of the number of types of functions that must be maintained on inventory and convenience of maintenance. Said local coders and decoders are preferably adapted to be bidirectional by providing appropriate gating in timing counters 186 and 194 so that the system is operative if the column timer 26 were connected at the other end of the series connection of said local coders and decoders. If the system also incorporates supervisory control 40, the system timing is adjusted so that the data representative of the test function and the supervisory call reset are detected after the data from each local coder 28 is latched so that the supervisory inputs would override the local control state date in all cases. In view of the switching speeds contemplated, the time gap between a particular data bit from the local coder and the overriding data bit from the supervisory control would be so slight as to be imperceptible.

While the supervisory control 40 provides some element of test capability to the system, a device for testing substantially the entire entertainment-service system would offer substantial advantages. To this end, a self-test circuit 220 is provided in each local control 22 as exemplified in FIG. 4, a 10-channel test signal generator is substituted for audio input 10 and a 5-channel test signal is substituted for audio input 16. Said test signal generators are adapted to produce over each of the system audio channels a test signal of predetermined characteristics not normally present in the audio input signal. The test signal is preferably a tone of a frequency within the audio frequency range to pass filters 104 and of sufficient strength to operate self-test circuit 220. The test signal generator may take any of the forms well known in the art and may be built into audio inputs 10 and 16. In such case, as shown in FIGS. 1 and 6, supervisory control 40 could be provided with switch 166 to remotely activate the ten channel test signal generator in audio input 10 by means of lines 167 and switch 168 to remotely activate the corresponding five channel test signal generator in audio input 16 by means of lines 169. The supervisory control incorporated in each of the other assemblies 8 would only incorporate switch 166 to control the test generator incorporated therein.

In its simplest form, said self-test circuit 220 is provided with a filter 222 connected to audio output line 110A–1 and filter 224 connected to audio output line 110A–2. These filters are selected to pass only the frequency generated by said test signal generators and are connected to "AND" gate 226 the output of which is connected to switch means 174. In the embodiment shown, switch means 174 is connected to manual lamp control 170 and adapted, in response to an output by "AND" gate 226, to override said lamp control to produce a unique indication on line 176 equivalent to the repetitive opening and closing of said lamp control. If the entire system were operating properly, every lamp 202 in the system would blink in response to the signal so generated. To further extend the scope of the test on the system, self-test circuit 220 preferably includes a first transducer sense means 228 connected to the input side of transducer 128 and a second transducer sense means 230 connected to the input side of transducer 130. Each of said transducer sense means is adapted to provide an output to gate 226 when the coil of its corresponding transducer 128 and 130 is intact, and therefore provides a low impedance to ground. However, if one or the other of said coils is broken, the resulting high impedance is sufficient to cut off the output of the corresponding transducer sense circuit so that the "AND" gate 226 for that particular local control is not actuated and the corresponding lamp 202 does not blink.

If steps are taken to insure that at least one of each of the channel selector means 116 is set to each of the possible channels, the blinking or failure to blink of lamps 202 provides a test of substantially all of the system.

Thus, since each "AND" gate 226 requires the proper functioning of the two audio input channels and the two transducer coils associated therewith, it is apparent that substantially all of the entertainment portion of the system, including the entire main multiplexer and zone submultiplexer and substantially all of the local demultiplexers are tested. Further, since the output of the gate is connected to the service portion of the system, substantially all of the column timers, local coders, and local decoders are also tested. In this connection, it is noted that the lamps 202 are also tested and that the balance of supervisory utilization circuit 38 and service call light 200 would be tested by the activation of the call light test switch 140 in supervisory control 40. Thus, by merely substituting test generators for audio inputs 10 and 16 the system performs an automatic self-test. This self-test results in substantial savings in time and labor and also provides a ready indication of the nature of any faults in the system through an analysis of the particular lamps 202 which fail to blink.

Figure 5:
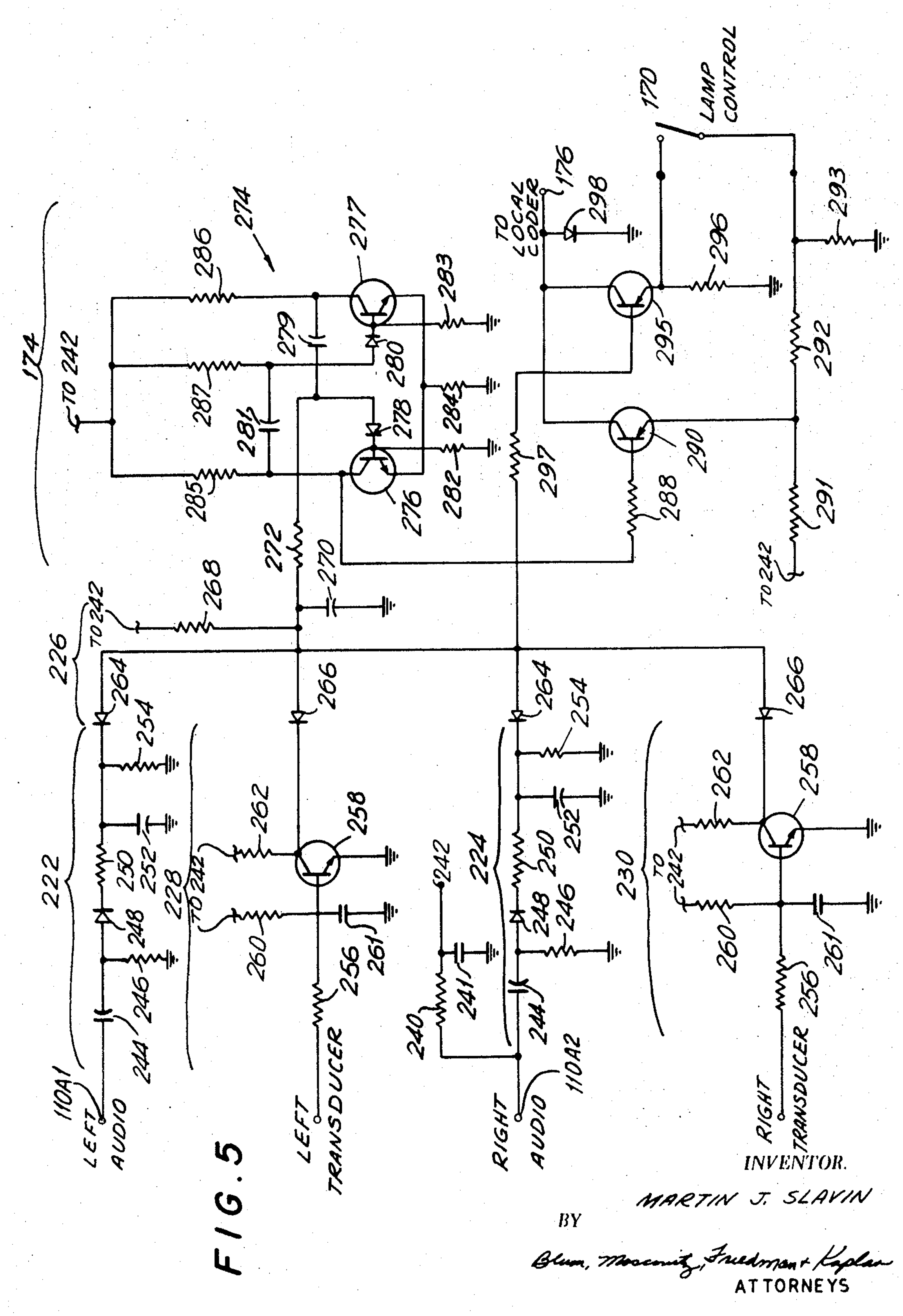
FIG. 5 is a circuit diagram of one-type of the self-test circuit of FIG. 4.

Turning now to FIG. 5, a detailed circuit diagram of self-test circuit 220 is shown. The power supply for said self-test circuit is provided by tapping off audio output line 110A–2 and filtering the DC component from that output by means of resistor 240 and capacitor 241. A rectifying arrangement tapping off the audio output line can also be utilized. A positive voltage thus appears at terminal 242 and the bias voltages for the remainder of the circuit are obtained by connecting to said terminal. Filters 222 and 224 are substantially identical, consisting of series connected capacitors 244 shunted to ground by resistors 246 to define a first filtering stage and diodes 248 and resistors 250 shunted to ground by capacitors 252 and resistors 256 to define a second filtering stage. Transducer sense means 228 and 230 are defined by series connected resistors 256 connected to the base of transistors 258. The bases of said transistors are also connected through resistors 260 to bias voltage terminal 242 and to ground through capacitors 261. The collectors of said transistors are connected through resistors 262 to said bias voltage terminal while the emitters thereof are connected to ground. Transistors 258 are normally biased off. However, if a transducer coil is broken and a high impedance to ground appears at the input to transducer sense means 228 or 230, then the transistor 258 of that transducer sense means will be forced into conduction to close "AND" gate 226.

Said "AND" gate consists of diodes 264 connected respectively at their cathodes to the output of transducer sense means 228 and 230 (the collector of transistors 258), and resistor 270 connected at one end to the anodes of diodes 264 and 266 and, at its other end, to the bias voltage terminal 242. The output of "AND" gate 226 is connected to the input of switch means 174 represented by capacitor 270 shunted to ground and series connected resistor 272, which in turn is connected to the input of astable multivibrator 274. Capacitor 270 provides a delay means for distinguishing the test signal from a portion of the regular audio input signal which might be of the test signal frequency. Said test signal frequency is preferably chosen from among those frequencies least likely to be present in normal audio programming. The test signal must be present for sufficient time to charge capacitor 270 to the triggering voltage of multivibrator 274, preferably about 15 seconds. Said triggering voltage provides still a further distinguishing characteristic of the test signal since a weak signal will be insufficient to trigger the multivibrator, and therefore to override the manual control of the corresponding lamp 202.

Said astable multivibrator includes transistors 276 and 277. The base of transistor 276 is connected to the cathode of diode 278, the base of which is connected through capacitor 279 to the collector of transistor 277. In like manner, the base of transistor 277 is connected to the cathode of diode 280 which in turn is connected to the collector of transistor 276 through capacitor 281. The base of transistors 276 and 277 are connected respectively through resistors 282 and 283 to ground. The emitters of said transistors are connected together, said common connection being connected through resistor 284 to ground. The collectors of said transistors are each connected through a resistor 285 and 286, respectively, to bias voltage terminal 242. The anode of diode 280 is connected to said bias voltage terminal through resistor 287, while the anode of diode 278 serves as the input to said multivibrator. The output of said multivibrator is taken at the collector of transistor 276 and is connected through resistor 288 to transistor 290.

The collector of transistor 290 is connected to output line 176 leading to the corresponding local coder. The emitter of said transistor is connected through resistor 291 to bias voltage terminal 242 and through resistor 292 to the movable arm of lamp control 170. Said movable arm is shunted to ground by means of resistor 293. The fixed terminal of lamp control 170 is connected to the emitter of transistor 295, said emitter also being connected to ground through resistor 296. The base of transistor 295 is connected through resistor 297 to the output of gate 226. The collector of said transistor is connected to the aforementioned line 176 which is shunted to ground by means of diode 298.

Switch means 174 operates as follows. When no test signal is detected, and the normal audio inputs 10 and 16 are applied, the manual closing of lamp control 170 turns on transistor 295 to present the appropriate signal to line 176, and therefore to the local coder. If said lamp control is open, transistor 295 is turned off, also giving the appropriate indication to said local coder. Transistor 290 is in the off condition during this mode since its base is returned to transistor 276 of astable multivibrator 274 which is normally off.

If a test signal is applied by means of a test signal generator, the detection of said test signal by the "AND" gate, assuming all components of the system are functioning properly, produces a DC level at capacitor 270 proportional to the amplitude of said test signal. This positive level is coupled through resistor 297 to the base of transistor 295 to maintain said transistor in reverse biased condition for the duration of the test signal detection. This in effect disables the control function of lamp control 170, the signal passed along line 176 now being under the control of transistor 290 alone. This transistor follows the voltage levels of transistor 276 of multivibrator 274, alternating conduction and nonconduction with transistor 277 in the known manner. Accordingly, the signal at line 176 is an alternating signal which produces a blinking lamp in the corresponding utilization circuit to indicate a successful test. If a test signal is not detected, indicating some failure, the voltage of capacitor 270 is very nearly zero and the return path for the base of transistor 290 is through diodes 264 and 266 and the resistive path upstream thereof. In the latter case, the state of the lamp would be governed by lamp control 170 and would be steady.

If the entertainment-service system includes the special channel governed by P.A. selector switch 75, the activation of which overrides all other channels to apply the contents of said special channel to all of the headsets 20 without regard to the setting of channel selector switches 116, said special channel can be readily tested using the arrangement according to the invention. Testing can be accomplished by adapting the test signal generator to selectively apply a test signal different from the normal test signal to said channel while the normal test signal is applied to the balance of the channels. If the lamps 202 stop blinking and return to their normal state, the override feature of the special channel is operating properly. This results from the fact that the signal on the special channel is applied to all of the audio output lines instead of the normal test signal. Said special test signal can be of a different frequency which is not passed by filters 222 and 224 or of insufficient strength to trigger multivibrator 274. A separate switch can be provided in supervisory control 40 to apply the special test signal to the special channel after switches 166 and 168 are closed.

Self-test circuit 220 is shown disposed in local control 22 but could be disposed in either local coder 28 or local demultiplexer 18. While in the embodiment shown, the self-test circuit is connected to override lamp 202, this is merely shown by way of example and not limitation and any utilization circuit capable of indicating a successful test could be used for this purpose. Thus, service call lights 200 could be used as the alarm. Further, the unique test state of the utilization circuit providing test indication need not be the blinking state used in the embodiment shown. For example, if service call lights 200 are used and reset button 142 of supervisory control 40 is depressed before test, the lighting of said service call lights could provide the test indication.

The entertainment-service system according to the invention has many applications. For example, the system can be applied to an aircraft or other means of transportation where it is necessary for each seat to individually control entertainment functions by selectively choosing a plurality of channels and service functions such as reading lamps and service call lights to attract the attention of stewardesses. In such an application, the zone submultiplexers 14 might represent a compartment on the aircraft, each local decoder, each local coder and local demultiplexer being associated with a row of seats within that compartment, and each local utilization circuit and local control being associated with a particular seat within that row. The entertainment-service system according to the invention is particularly advantageous for use in aircraft where weight considerations are of critical importance, since the multiplexing techniques used herein result in substantial savings in weight. Further, the self-test circuit expedites servicing time, therefore minimizing the downtime of an extremely valuable aircraft. Still other applications of the system according to the invention include, but are not limited to use in hospitals, intercom systems in buildings and all other circumstances wherein a plurality of remote stations are to be tied to a single entertainment-service system.

It will thus be seen that the objects set forth above, among those made apparent from the preceding description are efficiently obtained, and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. An entertainment-service system for a plurality of discrete stations comprising, a multichanneled source of audio input; multiplexing means connected to said source of audio input and adapted to sequentially sample each of said channels and transmit the content of said channels as a single signal; a plurality of remotely located demultiplexer means for receiving said single multiplexed signal; at least one control means disposed at each of said stations and associated with one of said demultiplexer means including channel selector means and utilization control means; at least one transducer means for converting an audio electrical signal to sound disposed at each station, said demultiplexer means each being adapted to reconstruct from the multiplexed signal the contents of the input channels selected by a channel selector means associated therewith and transmit same to the corresponding transducer means; at least one data line; a plurality of remotely located utilization circuits, at least one of said utilization control means being associated with each of said utilization circuits; a plurality of coder means for detecting the state of the utilization control means associated therewith and for transmitting, when activated, data representative of said state to said data line; decoder means associated with each coder means for controlling the state of the corresponding utilization circuits and for receiving, when activated, the data representative of the state of the corresponding utilization control means from said data line; column timer means for producing clock and frame synchronization pulses, said column timer means and coder means being in series connection and said column timer means and decoder means being in series connection in the same sequence as the corresponding coder means for sequential activation of each of said coder means and its corresponding decoder means in response to said pulses during the same time frame, whereby each of said utilization circuits is placed in a state responsive to the state of its corresponding utilization control means.

2. An entertainment-service system as recited in claim 1, including a plurality of further multichanneled sources of audio input; and a further multiplexer means connected to each of said further sources of audio input for receiving said single multiplexed signal from said first-mentioned multiplexer means, sequentially sampling each of the channels of said further source of audio input, and transmitting the content of said further channels as a single multiplexed signal interleaved into the signal of said first-mentioned multiplexer means, a portion of said demultiplexer means being adapted to receive said modified signal from each of said further multiplexer means. 3. An entertainment-service system as recited in claim 2, wherein said first-mentioned multiplexer means is adapted to allot, within each cycle of operation, one time frame for each channel of said first-mentioned source of audio input and one time frame for the greatest number of channels present in any one of said further sources of audio input, said first-mentioned multiplexer means transmitting timing pulses, the timing of said further multiplexer means and said demultiplexer means being derived from said timing pulses.

4. An entertainment-service system as recited in claim 1, wherein said multiplexer means includes stereo selector means for selectively interleaving stereo date in said multiplexer means single multiplexed signal if two selected channels constitute a single stereo program; said demultiplexer means being adapted to detect such stereo data and simultaneously transmit said two selected channels to said transducer means in response to a single channel selection of said channel selector means.

5. An entertainment-service system as recited in claim 4, wherein said stereo selector means produces a stereo tag bit interleaved in a predetermined time slot in the frame allocated to the first of two adjacent channels which together form a stereo program.

6. An entertainment-service system as recited in claim 1, wherein said multiplexing means converts each sample of the content of each channel of said source of audio input into a digital pulse code and transmits said digital pulse code in said single multiplexed signal, said demultiplexer means being adapted to convert said pulse code to an analogue signal representative of the content of the channel selected by its corresponding channel selector means.

7. An entertainment-service system as recited in claim 1, wherein said channel selector means includes a plurality of resistors and a multiposition switch means, each of said resistors being of a different value and having one end connected to a common terminal and the other end connected to one of said switch means positions, said demultiplexer means being adapted to detect the voltage characteristic of each switch means position to identify and transmit the contents of the selected channel to said transducer means.

8. An entertainment-service system as recited in claim 7, said dimultiplexer means including variable reference voltage means and comparator means for comparing the output of said variable reference voltage means and said detected voltage to identify said selected channel.

9. An entertainment-service system as recited in claim 1, including means for selectively activating one of said audio input channels, said multiplexer means including channel override means for selectively interleaving override data in said multiplexer means single multiplexed signal if said selected channel activation means is actuated, said demultiplexer means being adapted to detect said override data and transmit the contents of said selected channel to said transducer means without regard to the setting of said channel selector means.

10. An entertainment-service system as recited in claim 1, wherein said column timer means is connected to said data line for applying said clock and frame synchronization pulses thereto, the timing and reset of said coder means and decoder means being responsive to said pulses.

11. An entertainment-service system as recited in claim 1, wherein each of said coder means are interchangeable with each other and each of said decoder means are substantially interchangeable with each other.

12. An entertainment-service system as recited in claim 1, wherein said utilization circuits include at least one service call light associated with each station or group of stations, each of said service call lights being operated in response to the utilization control means disposed at said station or stations.

13. An entertainment-service system as recited in claim 12, including a supervisory utilization circuit for indicating the activation of any of said service call lights, said column timer means being adapted to receive from the said data line the data representative of the state of the portion of all of said utilization control means governing the operation of their corresponding service call lights and for controlling the state of said supervisory utilization circuit in response to said data.

14. An entertainment-service system as recited in claim 13, wherein said supervisory utilization circuit includes both a visual and an audible alarm means.

15. An entertainment system for a plurality of discrete stations comprising, a first multichanneled source of audio input; first multiplexing means connected to said first source of audio input and adapted to sequentially sample each of said channels and transmit the content of said channel as a single signal; a plurality of second multichanneled sources of audio inputs; a second multiplexer means connected to each of said further sources of audio input for receiving said single multiplexed signal from said first multiplexer means, sequentially sampling each of the channels of the second source of audio input associated therewith, and transmitting the content of said second channels as a single multiplexed signal interleaved into the signal of said first multiplexer means; a plurality of remotely located demultiplexer means for receiving said modified multiplexed signal from each of said second multiplexer means; at least one channel selector means disposed at each of said stations and associated with one of said demultiplexer means; at least one transducer means for converting an audio electrical signal to sound disposed at each station, said demultiplexer means each being adapted to reconstruct from the multiplexed signal the contents of the input channels selected by the channel selector means associated therewith and transmit same to the corresponding transducer means.

16. An entertainment system as recited in claim 15, wherein said first multiplexer means is adapted to allot, within each cycle of operation, one time frame for each channel of said first source of audio input and one time frame for the greatest number of channels present in any one of said second sources of audio input, said first multiplexer means transmitting timing pulses, the timing of said second multiplexer means and said demultiplexer means being derived from said timing pulses.

17. An entertainment system as recited in claim 15, wherein said multiplexer means includes stereo selector means for selectively interleaving stereo data in said multiplexer means single multiplexed signal if two selected channels constitute a single stereo program; and said demultiplexer means being adapted to detect such stereo data and simultaneously transmit said two selected channels to said transducer means in response to a single channel selection of said channel selector means.

18. An entertainment system as recited in claim 17, wherein said stereo selector means produces a stereo tag bit interleaved in a predetermined time slot in the frame allocated to the first of two adjacent channels which together form a stereo program.

19. An entertainment system as recited in claim 15, wherein said multiplexing means converts each sample of the content of each channel of said source of audio input into a digital pulse code and transmits said digital pulse code in said single multiplexed signal, said demultiplexer means being adapted to convert said pulse code to an analogue signal representative of the content of the channel selected by its corresponding channel selector means.

20. An entertainment system as recited in claim 15, wherein said channel selector means includes a plurality of resistors and a multiposition switch means, each of said resistors being of a different value and having one end connected to a common terminal and the other end connected to one of said switch means positions, said demultiplexer means being adapted to detect the voltage characteristic of each switch means position to identify and transmit the contents of the selected channel to said transducer means.

21. An entertainment system as recited in claim 20, said demultiplexer means including variable reference voltage means and comparator means for comparing the output of said variable reference voltage means and said detected voltage to identify said selected channel.

22. An entertainment system as recited in claim 15, including means for selectively activating one of said audio input channels, said multiplexer means including channel override means for selectively interleaving override data in said multiplexer means single multiplexed signal if said selected channel activation means is actuated, said demultiplexer means being adapted to detect said override data and transmit the contents of said selected channel to said transducer means without regard to the setting of said channel selector means.

23. A service system for a plurality of discrete stations comprising at least one utilization control means disposed at each of said stations; at least one data line; a plurality of remotely located utilization circuits, at least one of said utilization control means being associated with each of said utilization circuits; a plurality of coder means for detecting the state of the utilization control means associated therewith and for transmitting, when activated, data representative of said state to said data line; decoder means associated with each coder means for controlling the state of the corresponding utilization circuits for receiving, when activated, the data representative of the state of the corresponding utilization control means from said data line; column timer means for producing clock and frame synchronization pulses, said column timer means and coder means being in series connection and said column timer means and decoder means being in series connection in the same sequence as the corresponding coder means for sequential activation of each of said coder means and its corresponding decoder means in response to said pulses during the same time frame, whereby each of said utilization circuits is placed in a state responsive to the state of its corresponding utilization control means.

24. A service system as recited in claim 23, wherein said coder means are substantially identical and said decoder means are substantially identical.

25. A service system as recited in claim 23, wherein said utilization circuits include at least one service call light associated with each station or group of stations, each of said service call lights being operated in response to the utilization control means disposed at said station or stations.

26. A service system as recited in claim 25, including a supervisory utilization circuit for indicating the activation of any of said service call lights, said column timer means being adapted to receive from said data line the data representative of the state of the portion of all of said utilization control means governing the operation of their corresponding service call lights and for controlling the state of said supervisory utilization circuit in response to said data.

27. A service system as recited in claim 26, wherein said supervisory utilization circuit includes both a visual and an audible alarm means.

28. A service system as recited in claim 23, wherein said column timer means is connected to said data line for applying said clock and frame synchronization pulses thereto, the timing and reset of said coder and decoder means being responsive to said pulses.

29. A service system as recited in claim 23, wherein each of said utilization circuits includes at least one lamp for illumination of said station.

30. A service system as recited in claim 23, wherein each of said series connected coder means and decoder means receives the signal for activation thereof from the prior component in said series connection, each of said coder means and decoder means transmitting a signal for activation of the next component of said series connections upon completion of their respective cycles, all of said coder and decoder means being reset after the last thereof have completed their respective cycles.